(12) United States Patent
Darden, II et al.

(10) Patent No.: US 9,639,103 B2
(45) Date of Patent: *May 2, 2017

(54) SYSTEMS AND METHODS FOR OPTIMIZING MICROGRID POWER GENERATION AND MANAGEMENT WITH PREDICTIVE MODELING

(71) Applicant: Causam Energy, Inc., Raleigh, NC (US)

(72) Inventors: Thomas Francis Darden, II, Raleigh, NC (US); James Kevin Szyperski, Atlanta, GA (US); Joseph W. Forbes, Jr., Raleigh, NC (US)

(73) Assignee: Causam Energy, Inc., Raleigh, NC (US)

( * ) Notice: Subject to any disclaimer, the term of this patent is extended or adjusted under 35 U.S.C. 154(b) by 410 days.

This patent is subject to a terminal disclaimer.

(21) Appl. No.: 14/486,528

(22) Filed: Sep. 15, 2014

(65) Prior Publication Data

US 2015/0039147 A1   Feb. 5, 2015

Related U.S. Application Data

(63) Continuation of application No. 13/247,953, filed on Sep. 28, 2011, now Pat. No. 8,862,279.

(51) Int. Cl.
| | |
|---|---|
| G06F 19/00 | (2011.01) |
| G05F 1/66 | (2006.01) |
| G06Q 10/06 | (2012.01) |
| G06Q 50/06 | (2012.01) |
| H02J 3/38 | (2006.01) |
| G05B 13/04 | (2006.01) |
| G06N 5/04 | (2006.01) |
| H02J 3/00 | (2006.01) |

(52) U.S. Cl.
CPC ............. *G05F 1/66* (2013.01); *G05B 13/048* (2013.01); *G06N 5/04* (2013.01); *G06Q 10/063* (2013.01); *G06Q 50/06* (2013.01); *H02J 3/008* (2013.01); *H02J 3/381* (2013.01); H02J 2003/003 (2013.01); H02J 2003/007 (2013.01); Y02E 40/76 (2013.01); Y02E 60/76 (2013.01); Y04S 10/54 (2013.01); Y04S 10/545 (2013.01); Y04S 40/22 (2013.01); Y04S 50/10 (2013.01)

(58) Field of Classification Search
CPC . G06Q 50/06; G06Q 10/063; H02J 2003/003; Y04S 10/545
USPC .................................................. 700/291, 295
See application file for complete search history.

(56) References Cited

U.S. PATENT DOCUMENTS

| | | |
|---|---|---|
| 5,973,481 A | 10/1999 | Thompson et al. |
| 6,018,690 A | 1/2000 | Saito et al. |
| 6,107,693 A | 8/2000 | Mongia et al. |
| 6,154,859 A | 11/2000 | Norizuki et al. |
| 6,366,217 B1 | 4/2002 | Cunningham et al. |
| 6,583,521 B1 | 6/2003 | Lagod et al. |
| 6,747,368 B2 | 6/2004 | Jarrett, Jr. |
| 6,961,641 B1 | 11/2005 | Forth et al. |
| 7,115,010 B2 | 10/2006 | Parrott et al. |

(Continued)

Primary Examiner — Michael D Masinick
(74) Attorney, Agent, or Firm — Neo IP

(57) ABSTRACT

Systems and methods for coordinating selective activation of a multiplicity of emergency power generation equipment over a predetermined geographic area for distribution and/or storage to supply a microgrid of electrical power for a substantially similar geographic area.

19 Claims, 4 Drawing Sheets

(56) References Cited

U.S. PATENT DOCUMENTS

| | | |
|---|---|---|
| 7,141,321 B2 | 11/2006 | Mcarthur et al. |
| 7,142,949 B2 | 11/2006 | Brewster et al. |
| 7,233,843 B2 | 6/2007 | Budhraja et al. |
| 7,565,227 B2 | 7/2009 | Richard et al. |
| 7,657,480 B2 | 2/2010 | Harper |
| 7,715,951 B2 | 5/2010 | Forbes, Jr. et al. |
| 7,834,479 B2 | 11/2010 | Capp et al. |
| 7,873,442 B2 | 1/2011 | Tsui |
| 7,930,070 B2 | 4/2011 | Imes |
| 7,983,799 B2 | 7/2011 | Bose et al. |
| 8,010,812 B2 | 8/2011 | Forbes, Jr. et al. |
| 8,032,233 B2 | 10/2011 | Forbes, Jr. et al. |
| 8,145,361 B2 | 3/2012 | Forbes, Jr. et al. |
| 8,260,470 B2 | 9/2012 | Forbes, Jr. et al. |
| 8,307,225 B2 | 11/2012 | Forbes, Jr. et al. |
| 8,315,717 B2 | 11/2012 | Forbes, Jr. et al. |
| 8,359,124 B2 | 1/2013 | Zhou et al. |
| 8,364,609 B2 | 1/2013 | Ozog |
| 8,417,569 B2 | 4/2013 | Gross |
| 8,457,802 B1 | 6/2013 | Steven et al. |
| 8,473,111 B1 | 6/2013 | Shankar et al. |
| 8,571,930 B1 | 10/2013 | Galperin |
| 8,583,520 B1 | 11/2013 | Forbes |
| 8,588,991 B1 | 11/2013 | Forbes, Jr. |
| 8,718,850 B2 | 5/2014 | Bozchalui et al. |
| 2002/0019758 A1 | 2/2002 | Scarpelli |
| 2002/0019802 A1 | 2/2002 | Malme et al. |
| 2002/0036430 A1 | 3/2002 | Welches et al. |
| 2002/0161648 A1 | 10/2002 | Mason et al. |
| 2002/0198629 A1 | 12/2002 | Ellis |
| 2003/0149937 A1 | 8/2003 | Mcelfresh et al. |
| 2003/0158632 A1 | 8/2003 | Nierlich et al. |
| 2003/0176952 A1 | 9/2003 | Collins et al. |
| 2004/0024483 A1 | 2/2004 | Holcombe |
| 2004/0044571 A1 | 3/2004 | Bronnimann et al. |
| 2004/0051387 A1 | 3/2004 | Lasseter et al. |
| 2004/0107025 A1 | 6/2004 | Ransom et al. |
| 2004/0225514 A1 | 11/2004 | Greenshields et al. |
| 2005/0015283 A1 | 1/2005 | Iino et al. |
| 2005/0021397 A1 | 1/2005 | Cui et al. |
| 2005/0080772 A1 | 4/2005 | Bem |
| 2005/0096857 A1 | 5/2005 | Hunter |
| 2005/0096979 A1 | 5/2005 | Koningstein |
| 2005/0097204 A1 | 5/2005 | Horowitz et al. |
| 2005/0127680 A1 | 6/2005 | Lof et al. |
| 2005/0138432 A1 | 6/2005 | Ransom et al. |
| 2005/0288954 A1 | 12/2005 | Mccarthy et al. |
| 2006/0020596 A1 | 1/2006 | Liu et al. |
| 2006/0069616 A1 | 3/2006 | Bau |
| 2006/0190354 A1 | 8/2006 | Meisel et al. |
| 2006/0206240 A1 | 9/2006 | Tsui |
| 2006/0212350 A1 | 9/2006 | Ellis et al. |
| 2006/0224615 A1 | 10/2006 | Korn et al. |
| 2006/0276938 A1 | 12/2006 | Miller |
| 2006/0282328 A1 | 12/2006 | Gerace et al. |
| 2007/0038563 A1 | 2/2007 | Ryzerski |
| 2007/0040382 A1 | 2/2007 | Towada |
| 2007/0150353 A1 | 6/2007 | Krassner et al. |
| 2007/0156621 A1 | 7/2007 | Wright et al. |
| 2007/0156887 A1 | 7/2007 | Wright et al. |
| 2007/0174114 A1 | 7/2007 | Bigby et al. |
| 2007/0192333 A1 | 8/2007 | Ali |
| 2007/0214118 A1 | 9/2007 | Schoen et al. |
| 2007/0214132 A1 | 9/2007 | Grubb et al. |
| 2007/0260540 A1 | 11/2007 | Chau et al. |
| 2008/0010212 A1 | 1/2008 | Moore et al. |
| 2008/0040223 A1 | 2/2008 | Bridges et al. |
| 2008/0104026 A1 | 5/2008 | Koran |
| 2008/0109387 A1 | 5/2008 | Deaver et al. |
| 2008/0154801 A1 | 6/2008 | Fein et al. |
| 2008/0177678 A1 | 7/2008 | Di et al. |
| 2008/0195462 A1 | 8/2008 | Magdon-Ismail et al. |
| 2008/0231114 A1 | 9/2008 | Tolnar et al. |
| 2008/0249832 A1 | 10/2008 | Richardson et al. |
| 2008/0262820 A1 | 10/2008 | Nasle |
| 2008/0263025 A1 | 10/2008 | Koran |
| 2008/0270223 A1 | 10/2008 | Collins et al. |
| 2008/0278000 A1 | 11/2008 | Capp et al. |
| 2008/0281473 A1 | 11/2008 | Pitt |
| 2008/0306824 A1 | 12/2008 | Parkinson |
| 2008/0306830 A1 | 12/2008 | Lasa et al. |
| 2008/0319893 A1 | 12/2008 | Mashinsky et al. |
| 2009/0012996 A1 | 1/2009 | Gupta et al. |
| 2009/0024718 A1 | 1/2009 | Anagnostopoulos et al. |
| 2009/0045804 A1 | 2/2009 | Durling et al. |
| 2009/0055031 A1 | 2/2009 | Slota et al. |
| 2009/0062969 A1 | 3/2009 | Chandra et al. |
| 2009/0063122 A1 | 3/2009 | Nasle |
| 2009/0088907 A1 | 4/2009 | Lewis et al. |
| 2009/0112701 A1 | 4/2009 | Turpin et al. |
| 2009/0124241 A1 | 5/2009 | Krishnaswamy et al. |
| 2009/0125462 A1 | 5/2009 | Krishnaswamy et al. |
| 2009/0138362 A1 | 5/2009 | Schroedl et al. |
| 2009/0187344 A1 | 7/2009 | Brancaccio et al. |
| 2009/0198384 A1 | 8/2009 | Ahn |
| 2009/0228335 A1 | 9/2009 | Niyogi et al. |
| 2009/0240677 A1 | 9/2009 | Parekh et al. |
| 2009/0281673 A1 | 11/2009 | Taft |
| 2009/0281674 A1 | 11/2009 | Taft |
| 2009/0319415 A1 | 12/2009 | Stoilov et al. |
| 2010/0076613 A1 | 3/2010 | Imes |
| 2010/0076835 A1 | 3/2010 | Silverman |
| 2010/0106641 A1 | 4/2010 | Chassin et al. |
| 2010/0138452 A1 | 6/2010 | Henkin et al. |
| 2010/0169175 A1 | 7/2010 | Koran |
| 2010/0179704 A1 | 7/2010 | Ozog |
| 2010/0198421 A1 | 8/2010 | Fahimi et al. |
| 2010/0217452 A1 | 8/2010 | Mccord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0218108 A1 | 8/2010 | Crabtree et al. |
| 2010/0222934 A1 | 9/2010 | Iino et al. |
| 2010/0274407 A1 | 10/2010 | Creed |
| 2010/0293045 A1 | 11/2010 | Burns et al. |
| 2010/0306033 A1 | 12/2010 | Oved et al. |
| 2010/0332373 A1 | 12/2010 | Crabtree et al. |
| 2011/0025556 A1 | 2/2011 | Bridges et al. |
| 2011/0035073 A1 | 2/2011 | Ozog |
| 2011/0055036 A1 | 3/2011 | Helfan |
| 2011/0060474 A1 | 3/2011 | Schmiegel et al. |
| 2011/0071882 A1 | 3/2011 | Jakagnanam et al. |
| 2011/0080044 A1 | 4/2011 | Schmiegel |
| 2011/0082596 A1 | 4/2011 | Meagher et al. |
| 2011/0082597 A1 | 4/2011 | Meagher |
| 2011/0093127 A1 | 4/2011 | Kaplan |
| 2011/0106729 A1 | 5/2011 | Billingsley et al. |
| 2011/0115302 A1 | 5/2011 | Slota et al. |
| 2011/0118885 A1 | 5/2011 | Oi et al. |
| 2011/0133655 A1 | 6/2011 | Recker et al. |
| 2011/0145061 A1 | 6/2011 | Spurr et al. |
| 2011/0161250 A1 | 6/2011 | Koeppel et al. |
| 2011/0172835 A1 | 7/2011 | Imes |
| 2011/0172841 A1 | 7/2011 | Forbes, Jr. |
| 2011/0185303 A1 | 7/2011 | Katagi et al. |
| 2011/0196546 A1 | 8/2011 | Muller et al. |
| 2011/0204717 A1 | 8/2011 | Shaffer |
| 2011/0208366 A1 | 8/2011 | Taft |
| 2011/0235656 A1 | 9/2011 | Pigeon |
| 2011/0251730 A1 | 10/2011 | Pitt |
| 2011/0257809 A1 | 10/2011 | Forbes, Jr. et al. |
| 2011/0258022 A1 | 10/2011 | Forbes, Jr. et al. |
| 2012/0196482 A1 | 8/2012 | Stokoe |
| 2012/0205977 A1 | 8/2012 | Shin et al. |
| 2012/0221162 A1 | 8/2012 | Forbes, Jr. |
| 2012/0223840 A1 | 9/2012 | Guymon et al. |
| 2012/0232816 A1 | 9/2012 | Oh et al. |
| 2012/0259760 A1 | 10/2012 | Sgouridis et al. |
| 2012/0296799 A1 | 11/2012 | Playfair et al. |
| 2012/0316697 A1 | 12/2012 | Boardman et al. |
| 2013/0035802 A1 | 2/2013 | Khaitan et al. |
| 2013/0079939 A1 | 3/2013 | Darden, Ii et al. |
| 2013/0079943 A1 | 3/2013 | Darden, Ii et al. |
| 2013/0138285 A1 | 5/2013 | Bozchalui et al. |

(56) References Cited

U.S. PATENT DOCUMENTS

2013/0144768 A1  6/2013  Rohrbaugh
2014/0025486 A1  1/2014  Bigby et al.
2014/0039703 A1  2/2014  Forbes, Jr.
2014/0350743 A1* 11/2014  Asghari ............... G05B 13/048
                                                    700/297

* cited by examiner

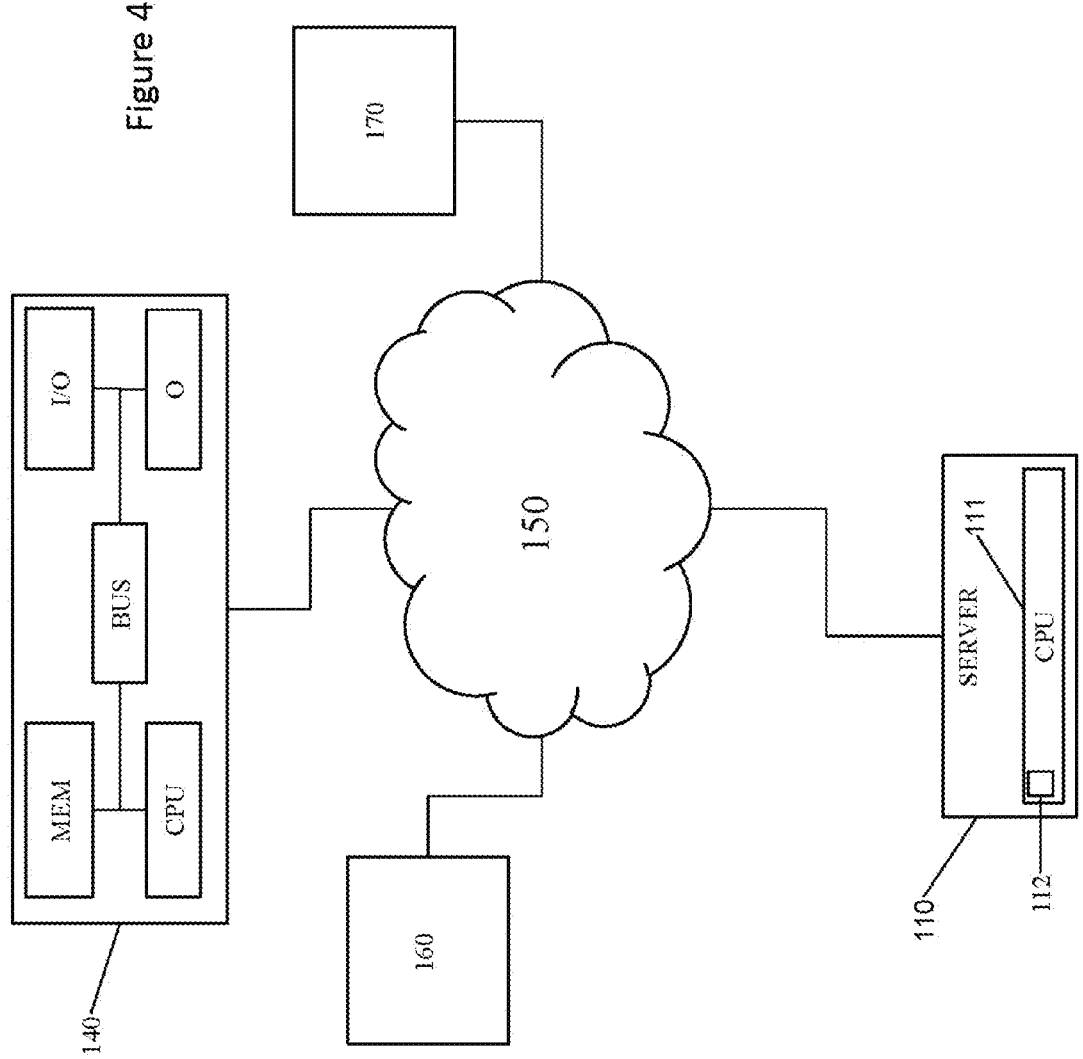

SYSTEMS AND METHODS FOR OPTIMIZING MICROGRID POWER GENERATION AND MANAGEMENT WITH PREDICTIVE MODELING

CROSS REFERENCE TO RELATED APPLICATIONS

This application is a continuation of U.S. patent application Ser. No. 13/247,953 filed Sep. 28, 2011, which is incorporated herein by reference in its entirety.

BACKGROUND OF THE INVENTION

1. Field of the Invention

The present invention relates to power generation and management, and more particularly, to predictive-modeling optimization of microgrid distributed power generation and management using emergency power generation equipment.

2. Description of the Prior Art

Prior art provides for power generation, generally for methods for optimizing microgrid function based on predicted or forecasted demand, including systems and methods for optimizing microgrid distributed power usage based on predictive algorithms of power demand.

By way of example the following are relevant prior art documents relating to power management:

U.S. Pat. No. 7,115,010 and U.S. Publication 2004/0051387 for "Control of small distributed energy resources, assigned to Wisconsin Alumni Research Foundation", which describe and teach a microsource system for providing power in an isolation mode or in a grid mode that is configured to couple to a power system without modification of the existing equipment in the power system, wherein the microsource system is configured for use in a microgrid, and wherein the microsource power source may be a fuel cell, a microturbine, battery, or photovoltaic cell.

U.S. Pat. No. 7,983,799 and U.S. Publication 2011/0118885 for "System and method for controlling microgrid", assigned on the document faces to General Electric, which disclose and teach a system for controlling a microgrid including microgrid assets, with at least one of the microgrid assets comprising a different type of electrical generator than an electrical generator of another of the microgrid assets; a tieline for coupling the microgrid to a bulk grid; and a tieline controller for providing tieline control signals to adjust active and reactive power in microgrid assets, and further describes that the electrical generators comprise at least one renewable energy source.

U.S. Pat. No. 7,834,479 and U.S. Publication 2008/0278000 for "Methods and systems for intentionally isolating distributed power generation sources", assigned on the document faces to Beacon Power Corporation, which disclose and teach a method for operating a mini-grid including one or more power generation sources and one or more loads connected to a bus. The method includes the steps of: monitoring a condition of the utility grid; disconnecting the mini-grid from the utility grid to operate the mini-grid independently in response to a power disruption over the utility grid; monitoring at least one of a frequency and a voltage of power on the bus; and providing an interconnect device connected to the bus, the interconnect device including at least one of: an energy storage device for absorbing or releasing real power to control the frequency of the power on the bus, and power quality compensator for absorbing or releasing reactive power to control the voltage of the power on the bus.

U.S. Publication 2007/0040382 for "Self-supporting power generation station", by inventor Towada, which teaches a scalable microgrid for providing power to areas remote from the existing power grid, wherein the microgrid comprises at least two power pods linked in parallel, and each power pod has at least one micro-turbine fueled by methane gas, and wherein additional power pods may be added as power needs increase.

By way of example, relevant documents relating to power management and optimization include:

U.S. Publication 2009/0062969 for "Hybrid robust predictive optimization method of power system dispatch", assigned on the document to General Electric, which describes a system for controlling and optimizing operation of a microgrid by integrating power generation, load and storage assets; it also describes a predictive algorithm that is used to dynamically schedule different assets, the predictive algorithm optimizes the microgrid operation over a predetermined time horizon based on predicted future microgrid asset conditions.

U.S. Publications 2010/0179704 and 2011/0035073 for "Optimization of microgrid energy use and distribution", assigned on the document face to Integral Analytics, Inc., which describes a system for optimization of energy use and distribution within a microgrid system, including forecasting of individualized demand by end-use or individualized demand by location for at least one customer or customer location, wherein forecasting of individualized demand may include inputs including: load prediction, weather forecast, risk given load uncertainty; customer compliance forecasts, customer probability of override forecasts; time of day effects; and day of week effects.

U.S. Publication 2010/0222934 for "System for managing energy at loads", by inventors Iino, et al., which teaches an energy management system comprising a demand prediction unit configured to predict demand at a load to which energy is supplied and a load adjustment range prediction unit to predict a load adjustment range by using historical data, wherein the system is applied to a microgrid capable of performing demand-side management.

U.S. Publication 2011/0082596 for "Real time microgrid power analytics portal for mission critical power systems" and U.S. Publication 2011/0082597 for "Microgrid model based automated real time simulation for market based electric power system optimization", each assigned on the document face to EDSA Micro Corporation, which describe a system for real-time modeling of electrical system performance of a microgrid electrical system, wherein predicted data for the electrical system is generating using a virtual system model, and the virtual system model is updated based on real-time data to forecast the cost of operating the microgrid and the reliability and availability of the microgrid system.

Furthermore, in relevant art, it is known to describe how energy pricing is integrated into the described forecasting models. By way of example of relevant prior art documents, consider the following:

U.S. Publication 2011/0082596 for "Real time microgrid power analytics portal for mission critical power systems" and U.S. Publication 2011/0082597 for "Microgrid model based automated real time simulation for market based electric power system optimization", each assigned on the document faces to EDSA Micro Corporation, which teach a system for real-time modeling of electrical system performance of a microgrid electrical system, wherein predicted data for the electrical system is generating using a virtual system model that is updated based on real-time data to forecast the cost of operating the microgrid and the reliability and availability of the microgrid system. Furthermore, all transactions between the public electric service on the macrogrid and the microgrid infrastructure are closely monitored, and rate and pricing information for the management of electricity exchange are also maintained. Closely monitoring this information and updating the virtual and real time models accordingly allows the systems and methods disclosed herein to optimize energy consumption to meet various objectives of the microgrid operator, wherein predicted data can be used to generate market-based pricing predictions based on the performance of the components of the electrical system.

U.S. Publication 2008/0262820 for "Real-time predictive systems for intelligent energy monitoring and management of electrical power networks" and U.S. Publication 2009/0063122 for "Real-time stability indexing for intelligent energy monitoring and management of electrical power network system", each assigned to EDSA Micro Corporation, which teach the following: the '820 publication describes a system for intelligent monitoring and management of an electrical system including a data acquisition component to acquire real-time data from the electrical system; a power analytics server comprising a real-time energy pricing engine connected to a utility power pricing data table and configured to generate real-time utility power pricing data, a virtual system modeling engine to generate predicted data output for the electrical system, an analytics engine configured to monitor the real-time data output and the predicted data output of the electrical system, a machine learning engine configured to store and process patterns observed from the real-time data output and the predicted data output and configured to forecast an aspect of the electrical system. The '122 publication is a continuation-in-part of '820 and also describes a system for intelligent monitoring and management of an electrical system U.S. Publication 2010/0198421 for "Methods and apparatus for design and control of multi-port power electronic interface for renewable energy sources", assigned on the document face to Board of Regents, The University of Texas System, which teaches a method for managing energy movement wherein a determination of whether operational characteristics should be modified is based on at least one factor of: a renewable energy generation forecast, an energy consumption forecast, and a substantially real-time price of energy, with the application of this method and apparatus in a microgrid setting.

U.S. Pat. No. 7,873,442 and U.S. Publication 2006/0206240 for "System and method for managing and optimizing power use", each assigned on the respective document faces to The Energy Authority, Inc., which describe an optimization method for the use of utility power including the steps of: initializing a utility power load requirement forecast, an amount of available utility power, and aggressiveness position for optimizing the use of available power, a utility power schedule; determining an initial power use position for a peak load utility power use range and a low load range; adjusting the utility power use for real-time transactions, adjusting for utility power storage flexibility, and producing a utility power use schedule optimized for use of said utility power in low load range and peak load range, wherein the real-time schedule optimization provides information on how to adjust the use of resources when updated load forecasts based on actual load, and market prices change during the day.

U.S. Pat. No. 7,930,070 and U.S. Publication 2010/0076613 for "System, method, and module capable of curtailing energy production within congestive grid operating environments", and U.S. Publication 2011/0172835 for "System and method of curtailing energy production within congestive grid operating environments", each assigned on the document face to Kingston Consulting, Inc., which describe a method of managing power generation that provides a framework to allow proactive management of alternative energy production through asset monitoring and characterization relative to real-time and anticipated grid conditions, and further describes that the energy management system can perform congestion forecasting, energy output forecasting, proactive curtailments, storage control, dispatch control, real-time pricing, dynamic pricing, or various combinations of features, and a remote monitor and control module that can include on-grid and off-grid control logic, real-time performance monitoring, meteorological data interface, microgrid or asynchronous transmission capabilities, local performance characterization logic, a control panel, or various combinations of features.

U.S. Publication 2011/0093127 for "Distributed energy resources manager" by inventor Kaplan, which describes a distributed energy resources manager that connects electrical assets in an electricity distribution grid with other information processing systems to optimize a flow of electric power within the electricity distribution grid.

Further describes that distributed resources may be utilized to meet system-wide needs such as reducing peak consumption, storing excess utility-scale wind or solar power, responding to price signals including real-time or critical peak pricing, or supply ancillary grid services.

U.S. Publication 2011/0071882 for "Method and system for intermediate to long-term forecasting of electric prices and energy demand for integrated supply-side energy planning", assigned on the document face to International Business Machines Corporation, which describes a method of price forecasting in an electrical energy supply network and/or load (energy demand) forecasting of a given consumer of electrical energy, for identifying the optimal mix of energy hedge and exposure to day ahead/spot market prices for deriving economic benefits in overall energy expenditure; and further describes modeling using real time price and day ahead price data and probability distributions.

U.S. Pat. No. 7,657,480 for "Decision support system and method", which was assigned on the document face to Air Liquide Large Industries, and describes a computer-implemented method for identifying an excess energy capacity in a production supply chain by a supply chain operator, in which the supply chain operator also operates at least one power generation facility to sustain industrial production by the production supply chain, the supply chain operator is capable of consuming and selling electricity produced by the power generation facility; and further describes that the forecasted price for electricity during a time period is determined by a forecasting and planning model utilizing historical and real-time data, including the real-time commodity prices for electricity.

U.S. Pat. No. 6,583,521 for "Energy management system which includes on-site energy supply" to inventors Lagod, et al., which describes a system for managing the supply of power to a load that receives power from an electric grid, including: at least one on-site power generator that is capable of supplying power to the load independently of the power grid; a controller which processes data relating to at least one factor that is predictive of the reliability and/or quality of power supplied to the load, and selects the power grid or the on-site generator as a preferred power source; and a switch which is responsive to the selection of the preferred power source to connect the load to the selected power source, and further describes that the selection of the preferred power source may be on the basis of relative costs of power supplied via the power grid and the on-site generator; and the relative costs may include data regarding operating costs of the on-site generator, the price of fuel consumed by the on-site generator, and time-of-day pricing (including real time pricing) of power supplied via the power grid.

U.S. Publication 2005/0015283 for "Electric-power-generating-facility operation management support system, electric-power-generating-facility operation management support method, and program for executing support method, and program for executing operation management support method on computer", assigned on the document face to Kabushiki Kaisha Toshiba, which describes an electric-power-generating-facility operation management support system for determining economically-optimal operational conditions based upon real-time information with regard to the demand for the electric power and the price thereof as well as information with regard to properties of the electric power generating facilities.

SUMMARY OF THE INVENTION

The present invention relates to predictive-modeling-based optimization of power generation and management systems and methods for microgrid distributed power generation applications, including selective, coordinated engagement of emergency power generation equipment, such as, by way of example and not limitation, generators.

It is an object of this invention to provide systems and methods for microgrid distributed power generation and management using emergency power generation equipment optimized using predictive modeling methods for selective engagement to provide power supply for distribution and/or storage based upon the grid power demands, energy pricing changes, predetermined levels of market rates, and combinations thereof.

Accordingly, a broad embodiment of this invention is directed to power generation systems and methods that selectively engage and harness emergency power generation equipment to produce electricity for distribution over a microgrid and/or for storage until later distribution. Furthermore, the present invention includes embodiments in systems and methods using predictive modeling for optimization and coordinated selective activation of emergency power generation equipment over a predetermined geographic area for distribution and/or storage to supply a microgrid of electrical power based upon at least one market-based factor, including but not limited to energy rates in the market, pricing changes, power demand within the microgrid, and combinations thereof.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 4 is a schematic diagram of a networked system and remote server computer associated with the systems and methods of the present invention illustrated in the other figures.

DETAILED DESCRIPTION

Figure 1:
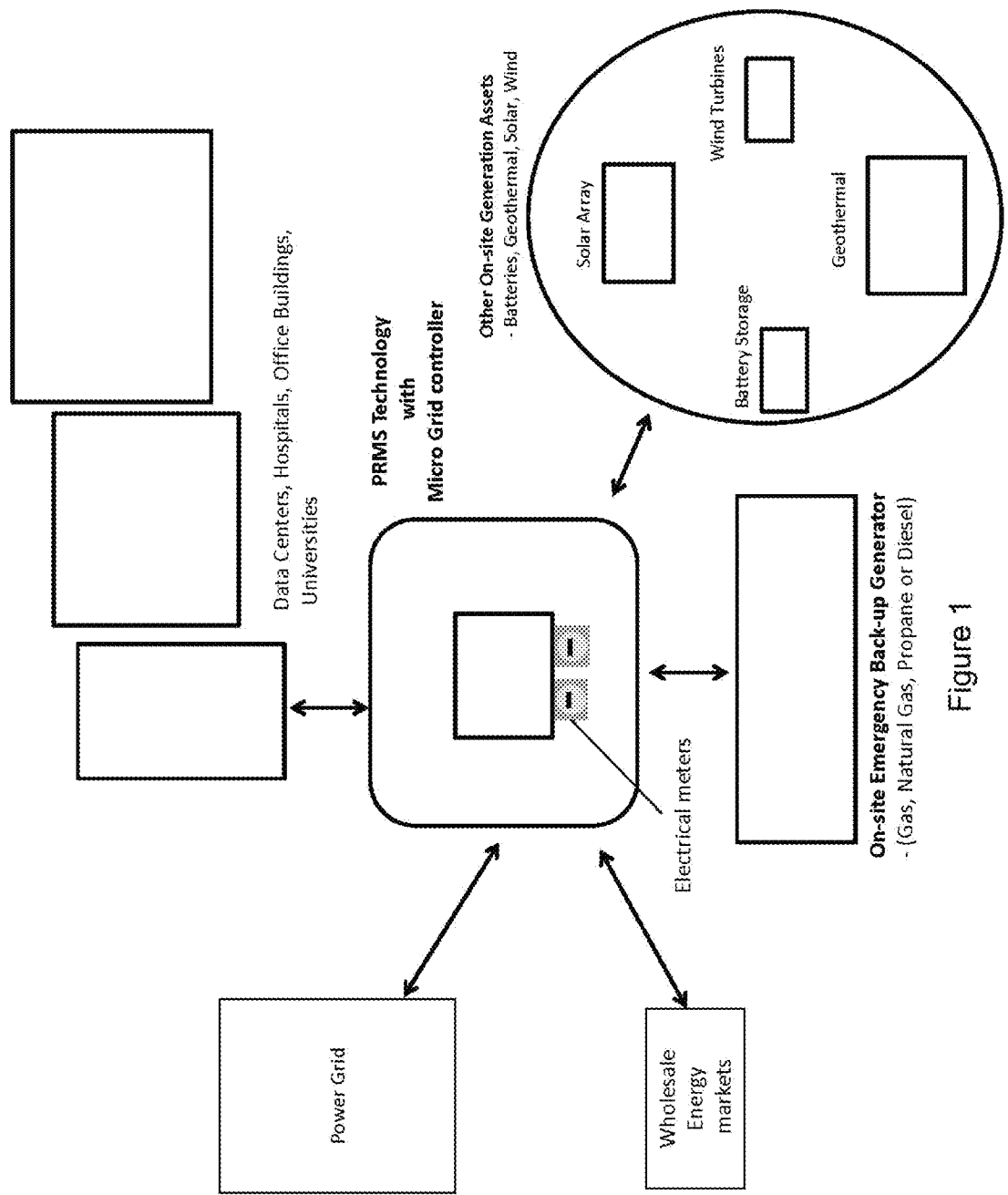
FIG. 1 is a schematic diagram illustrating one embodiment of the present invention.

Referring now to the drawings in general, the illustrations are for the purpose of describing a preferred embodiment of the invention and are not intended to limit the invention thereto.

The present invention provides methods for power generation and management including the steps of: providing power generation systems including at least one piece of equipment for generating electrical power located at predetermined, distributed locations for providing emergency back-up power supply for use in situs (on site or on location of the source of power generation), i.e., without distribution of the electrical power beyond the locality where it is generated; and using predictive modeling methods to optimize timing for selective engagement of the power generation equipment; and selectively activating the power generation equipment to produce electricity for distribution over a microgrid and/or for storage until later distribution over the microgrid.

The present invention also provides a system for power generation and management including: a multiplicity of power generation equipment located at predetermined, distributed locations for providing emergency back-up power supply for use in situs, without distribution of the electrical power beyond the locality where it is generated; wherein the equipment is selectively activatable, and constructed and configured in connection with an electrical power microgrid to produce electricity for distribution over the microgrid and/or for storage until later distribution over the microgrid; and further including optimization of power supply to the microgrid using predictive modeling methods for selective engagement, including a Price Resource Management System (PRMS), including:

a monitoring device that tracks real time wholesale energy market price;

a database for storing wholesale energy market price;

an analyzing device for storing and analyzing wholesale market price data, and on a per power storage device basis, data indicative of the electricity remaining in that specific device;

at least one server computer, located centrally or distributed over a network, the at least one server computer in network communication for monitoring and being responsive to the market price fluctuation analysis, and operable for generating event instructions to a controllable device for releasing electrical power to the power grid for distribution when the market price is at least at a predetermined threshold(s) at which point the power generated is directed to be released and sold to the power grid (note that the power may be generated directly for immediate distribution or for temporary storage before distribution);

a device interface for facilitating and producing communication of power releasing instructions to at least one controllable device on power storage device; and at least one controllable device associated with and preferably connected to the at least one power generator and/or electricity storage device, wherein each controllable device is operable for selectively enabling and disabling the flow of electric power from the electric storage to an electric grid, preferably a microgrid, for distribution thereon.

Preferably, embodiments of the present invention include systems and methods for coordinating selective activation of a multiplicity of emergency power generation equipment over a predetermined geographic area for distribution and/or storage to supply a microgrid of electrical power for a substantially similar geographic area.

By way of example but not limitation, the systems and methods of the present invention are applied to emergency back-up power generation equipment, specifically gasoline or diesel powered generators, located at cellular tower sites. While typically the generators must be activated at least once per week or so, i.e., for maintenance activation, in order to ensure functionality when the emergency power provided by the generator is needed, due to electrical grid power failure or loss, their activation is arbitrary, and the power generated during the maintenance activation is not harnessed or used in any way.

FIG. 1 illustrates a schematic diagram of a system illustrating an embodiment of the present invention. Components of the system provide for operation of a microgrid system constructed and configured for automatically managing electricity generation and releasing by a cell tower emergency power backup generator based on predictive modeling of real time wholesale energy market price, including at least one power generator. Preferably, the at least one power generator includes at least one electricity generator. More preferably, the present invention provides for at least one power generator that is associated with a cell tower for the use of emergency backup during electricity blackout. Furthermore, the at least one power generator may include more than one type of power generator. In one embodiment of the present invention the at least one power generator is selected from the group consisting of solar arrays, natural gas generators, propane generators, diesel generators, and combinations thereof. In another embodiment, the at least one power generator includes at least two different types of power generating equipment, selected from the group consisting of solar arrays, natural gas generators, propane generators, diesel generators, and combinations thereof. The present invention is constructed and configured to generate electricity for immediate supply through direct connection into a microgrid electrical distribution system. Additionally, in preferred embodiments, the system of the present invention further includes at least one energy storage mechanism or device for providing temporary power storage, for selectively discharging electricity into a microgrid.

For optimization of management of power generation and distribution via the systems and methods of the present invention, in addition to the foregoing, the system further includes the components of a Price Resource Management System (PRMS), including:

a monitoring device that tracks real time wholesale energy market price;

a database for storing wholesale energy market price;

an analyzing device for storing and analyzing wholesale market price data, and on a per power storage device basis, data indicative of the electricity remaining in that specific device;

at least one server computer, located centrally or distributed over a network, the at least one server computer in network communication for monitoring and being responsive to the market price fluctuation analysis, and operable for generating event instructions to a controllable device for releasing electrical power to the power grid for distribution when the market price is at least at a predetermined and/or programmable threshold(s) at which point the power generated is directed to be released and sold to the power grid (note that the power may be generated directly for immediate distribution or for temporary storage before distribution);

a device interface for facilitating and producing communication of power releasing instructions to at lease one controllable device on power storage device;

at lease one controllable device associated with and preferably connected to the at least one power generator and/or electricity storage device, wherein each controllable device is operable for selectively enabling and disabling the flow of electric power from the electric storage to an electric grid, preferably a microgrid, for distribution thereby (public).

In preferred embodiments of the systems and methods of the present invention, the PRMS stores, monitors and analyzes the real time wholesale energy market price for use with predictive modeling for optimized power generation timing, management, storage, and distribution to a microgrid. By using predictive modeling, when wholesale energy market price reaches a predetermined threshold, the PRMS generates instructions to the at least one controllable device associated with each power generator and/or electricity storage device to release and sell power to public power grids.

Figure 2:
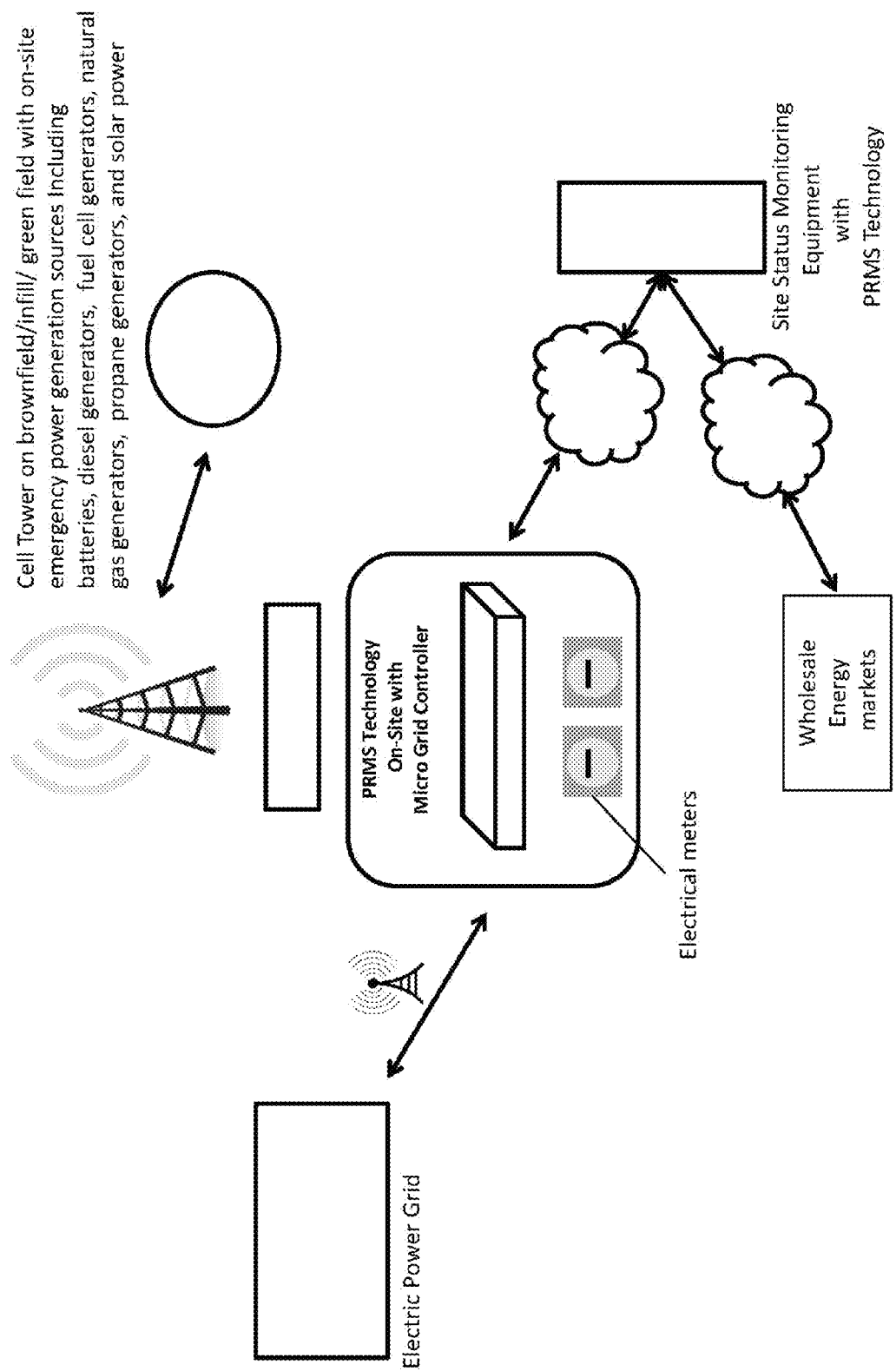
FIG. 2 is another schematic diagram illustrating one embodiment of the invention.

FIG. 2 shows a flow diagram illustrating one embodiment of the invention. Steps of managing power generation and distribution for a microgrid are shown, including providing a power generation system including at least one piece of equipment for generating electrical power located at predetermined, distributed locations for providing emergency back-up power supply for use at the locations of power generation, without distribution of the electrical power beyond the locality where it is generated; and selectively activating the power generation equipment to produce electricity for distribution over a microgrid and/or for storage until later distribution over the microgrid.

Figure 3:
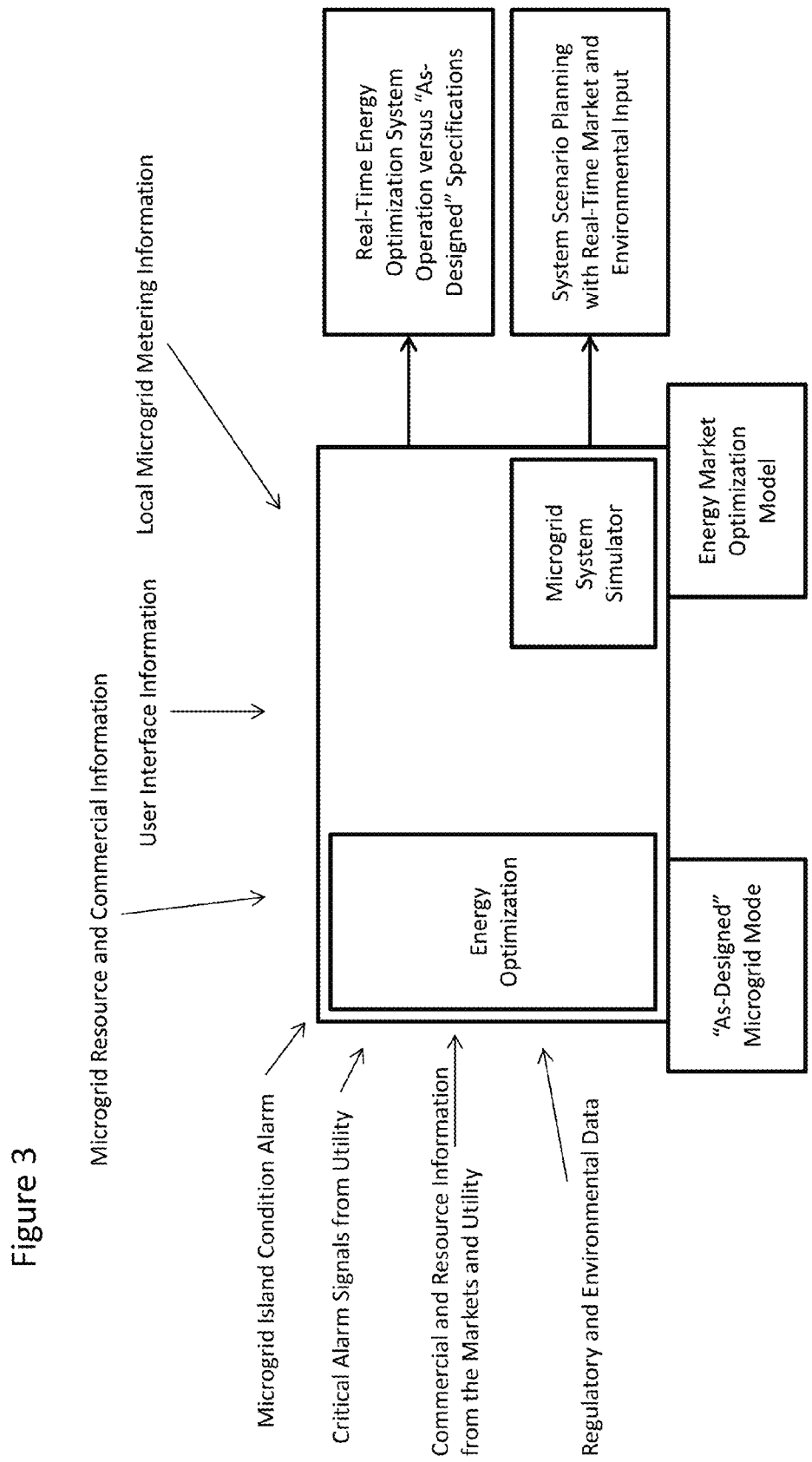
FIG. 3 is a diagram of the central controller illustrated in FIG. 2.

FIG. 2 shows another schematic diagram illustrating one embodiment of the invention. Steps of managing power generation and distribution for a microgrid are shown, including providing a power generation system including at least one piece of equipment for generating electrical power located at predetermined, distributed locations for providing emergency back-up power supply for use at the locations of power generation, without distribution of the electrical power beyond the locality where it is generated; and selectively activating the power generation equipment to produce electricity for distribution over a microgrid and/or for storage until later distribution over the microgrid. FIG. 3 illustrates a diagram of the central controller illustrated in FIG. 2.

FIG. 4 is a schematic diagram of a networked system and remote server computer associated with the systems and methods of the present invention. As illustrated in FIG. 4, a basic schematic of some of the key components of the system including remote server computer and network access to the microgrid distributed power generation equipment, according to the present invention are shown. The system 100 comprises a server 110 with a processing unit 111. The server 110 is constructed, configured and coupled to enable communication over a network 150. The server provides for user interconnection with the server over the network using a personal computer (PC) 140 positioned remotely from the server. Furthermore, the system is operable for a multiplicity of remote personal computers or terminals 160, 170. For example, in a client/server architecture, as shown. Alternatively, a user may interconnect through the network 150 using a user device such as a personal digital assistant (PDA), mobile communication device, such as by way of example and not limitation, a mobile phone, a cell phone, smart phone, laptop computer, netbook, a terminal, or any other computing device suitable for network connection. Also, alternative architectures may be used instead of the client/server architecture. For example, a PC network, or other suitable architecture may be used. The network 150 may be the Internet, an intranet, or any other network suitable for searching, obtaining, and/or using information and/or communications. The system of the present invention further includes an operating system 112 installed and running on the server 110, enabling server 110 to communicate through network 150 with the remote, distributed devices, including controller, monitoring device, power generation equipment, and combinations thereof. The operating system may be any operating system known in the art that is suitable for network communication.

From a microgrid supply described hereinabove, the power may be further distributed over a wider power grid. For the purposes of this application, the ability to provide power generation creates a microgrid on site with the power generation equipment; surplus generation may be further distributed beyond the immediate location of the power generation, i.e., beyond the microgrid created thereby, to a broader electrical power grid, a primary grid, and the like, wherein the electricity supplied thereto is provided by a variety of sources (e.g., an energy company).

Certain modifications and improvements will occur to those skilled in the art upon a reading of the foregoing description. By way of example and not limitation, systems and methods of the present invention for providing microgrid power from power generators may supply the power directly into a microgrid or may temporarily store the power generated in energy storage mechanisms or apparatus, such as a power cell or battery, wherein the storage is intended to be released at and for at least one predetermined time into the grid, such as peak grid load times, or high energy demand times, or at times that are calculated based upon energy distribution optimization considerations. And combinations of these factors. Preferably the systems and methods include a remote server computer that is operable in networked communication with the at least one piece of equipment for monitoring the status of the equipment and for activating the equipment remotely based upon triggers identified by the PRMS. Also, the present invention systems and methods provide for curtailment applications wherein if the power goes out to the grid, and the emergency back-up power generation has registered with the power company or management entity, then every time the emergency power is generated, then the system provides for automatic credit for that period of self-supplied or self-generated power even where that power is not distributed over the broader grid.

The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method for optimized power generation and management comprising steps of:
providing a microgrid including at least one power generation equipment for generating electrical power located at predetermined, distributed locations for providing emergency back-up power supply for use at the locations of power generation;
providing a Price Resource Management System (PRMS) coupled with the at least one power generation equipment, the PRMS providing predictive modeling;
storing, monitoring and analyzing a real-time wholesale energy market price for use with the predictive modeling for optimized power generation timing, management, storage, and/or distribution to the microgrid;
at least one server computer, located centrally or distributed over a network, for monitoring and responding to the real-time wholesale energy market price fluctuation analysis for use with the predictive modeling, and operable for automatically generating event instructions to a controllable device based on the predictive modeling of the real-time wholesale energy market price for automatically releasing electrical power to the microgrid for distribution when the real-time wholesale energy market price is at least at a predetermined threshold(s);
a device interface for facilitating and producing communication of power releasing instructions to at least one controllable device coupled with the at least one power generator and/or electricity storage device, wherein each controllable device is operable for automatically selectively enabling and disabling the flow of electric power to the microgrid and for distribution to the grid or the microgrid; and
selectively activating the power generation equipment to produce electricity for distribution over the microgrid and/or for storage until later distribution via the microgrid.

2. The method of claim 1, further including a step of storing, monitoring, and analyzing data indicative of electricity in a power storage device.

3. The method of claim 1, further including a step of the at least one server computer coordinating selective activation of at least two emergency power generation equipments over a predetermined geographic area for distribution and/or storage to the microgrid using a PRMS-based optimization timing.

4. The method of claim 1, wherein the method provides for selective activation of the power generation equipment based upon factors including when the real-time wholesale energy market price is at least at a predetermined threshold, changes in energy pricing, peak demand for energy from the microgrid.

5. The method of claim 1, wherein the method provides for selective activation of the power generation equipment to supply power to charge a power storage device.

6. The method of claim 1, further including a step of the PRMS generating instructions to at least one controllable device associated with each of the at least one power generation equipment to release power to sell to public power grids.

7. The method of claim 1, further including a step of the PRMS generating instructions to at least one controllable device associated with at least one electricity storage device to release stored power to sell to public power grids.

8. The method of claim 1, wherein the method provides for the selective activation of the power generation equipment on a regular basis at least once per day.

9. The method of claim 1, wherein the method provides for the selective activation of the power generation equipment on a regular basis at least once per week.

10. The method of claim 1, wherein the method provides for the selective activation of the power generation equipment on a regular basis at least once per month.

11. The method of claim 1, wherein the system further includes an automated remote controller for activating the at least one piece of equipment based upon instruction received by the controller from the remote server computer.

12. The method of claim 1, wherein the system further includes a remote server computer in networked communication with the at least one piece of equipment for monitoring the status of the equipment and for activating the equipment remotely.

13. A method for optimized power generation and management comprising steps of:
providing a power grid including at least one power generation equipment for generating electrical power located at predetermined, distributed locations for providing emergency back-up power supply for use at the locations of power generation;
providing a Price Resource Management System (PRMS) coupled with the at least one power generation equipment, the PRMS providing predictive modeling;
storing, monitoring and analyzing a real-time wholesale energy market price for use with the predictive modeling for optimized power generation timing, management, storage, and/or distribution to the power grid;
an analyzing device for storing and analyzing the real-time wholesale energy market price with the predictive modeling;
at least one server computer, located centrally or distributed over a network, for monitoring and being responsive to the real-time wholesale energy market price fluctuation analysis for use with the predictive modeling, and operable for automatically generating event instructions to at least one controllable device based on the predictive modeling of the real-time wholesale energy market price for automatically releasing electrical power to the power grid for distribution when the real-time wholesale energy market price is at least at a predetermined threshold(s);
a device interface for facilitating and producing communication of power releasing instructions to at least one controllable device on the power storage device;
at least one controllable device associated with and preferably connected to the at least one power generator and/or electricity storage device, wherein each controllable device is operable for automatically selectively enabling and disabling the flow of electric power to the power grid and for distribution to the power grid; and
selectively activating the power generation equipment to produce electricity for distribution over the power grid and/or for storage until later distribution.

14. A system for microgrid distributed power generation and management comprising:
a multiplicity of power generation equipment and/or power storage device(s) located at predetermined, distributed locations for providing emergency back-up power supply for use in situs, without distribution of the electrical power beyond the locality where it is generated; and
a Price Resource Management System (PRMS) connected to the at least one power generation equipment, and operable for:
storing, monitoring and analyzing the real-time wholesale energy market price for use with the predictive modeling for optimized power generation timing, management, storage, and distribution to a microgrid;
an analyzing device for storing and analyzing real-time wholesale energy market price, and on a per power storage device basis, data indicative of the electricity remaining in the power storage device;
at least one server computer, located centrally or distributed over a network for monitoring and being responsive to the real-time wholesale energy market price fluctuation analysis analyzed for use with the predictive modeling, and operable for automatically generating event instructions to a controllable device based on the predictive modeling of the real-time wholesale energy market price for automatically releasing electrical power to the microgrid for distribution when the real-time wholesale energy market price is at least at a predetermined threshold;
a device interface for facilitating and producing communication of power releasing instructions to at least one controllable device on the power storage device(s);
at least one controllable device coupled with the at least one power generator and/or power storage device(s), wherein each controllable device is operable for automatically selectively enabling and disabling the flow of electric power from the at least one power generator and/or electric storage to an electric microgrid; and
selectively activating the power generation equipment to produce electricity for the microgrid, wherein the equipment is remotely, selectively, and automatically activatable when the real-time wholesale energy market price is at a predetermined threshold.

15. The system of claim 14, further including more than one power generation equipment that is operable for coordinated, selective activation.

16. The system of claim 14, further including a multiplicity of emergency power generation equipment positioned apart over a predetermined geographic area for distribution and/or storage to supply a microgrid of electrical power.

17. The system of claim 14, wherein the at least one equipment is automatically selectively activatable at predetermined times based upon the PRMS-based model.

18. The system of claim 14, wherein the at least one equipment is selectively activatable during periods when the electrical grid experiences high demand for power supply.

19. The system of claim 14, wherein the at least one server computer includes a remote server computer that is operable in networked communication with the at least one piece of equipment for monitoring the status of the equipment and for activating the equipment remotely based upon triggers identified by the PRMS.

* * * * *